United States Patent Office 2,857,337
Patented Oct. 21, 1958

2,857,337

METHOD OF PREPARING HYDROGENATION CATALYSTS

Jefferson Merritt Hamilton, Wilmington, Del., and Louis Spiegler, Woodbury, N. J., assignors to E. I. du Pont de Nemours and Company, Wilmington, Del., a corporation of Delaware No Drawing. Application May 10, 1955
Serial No. 507,478

14 Claims. (Cl. 252—472)

This invention is directed to a method of preparing hydrogenation catalysts wherein palladium is deposited on an inert support. The catalysts prepared by the process of this invention are utilized for the hydrogenation of organic nitro compounds; in particular they are useful in the catalytic reduction of aromatic nitro compounds to the corresponding amines.

Palladium hydrogenation catalysts are known in the art and have been prepared in numerous ways such as by impregnating an absorbent support with the noble metal salt solution by evaporating a solution of said salt in the presence of the support. Another method involves the precipitation of palladium hydroxide in the presence of an inert support by adding a palladium chloride solution to a hot solution of sodium carbonate in which the support is suspended; as an alternate procedure, the carbonate may be added to the palladium chloride solution. Catalysts prepared by these known methods are active for hydrogenation but do not yield the high hydrogenation rates desired when used at low concentrations.

It is an object of this invention to prepare a hydrogenation catalyst employing noble metals which effect a high rate of catalytic reduction of nitro compounds to the corresponding amines with a minimum concentration of catalyst.

It has been found that supported palladium catalysts will yield improved rates of hydrogenation if prepared by the method of this invention which involves the preparation, at room temperature, of a solution or colloidal solution of a palladium salt in aqueous alkaline metal bicarbonate system and heating the resulting palladium solution in the presence of an inert support to about 95° C. for a 15-20 minute period after which time the soluble palladium will no longer be present. The catalyst prepared by this procedure is reduced prior to use and yields rates of hydrogenation of an unexpected substantial increase over methods known in the prior art.

The palladium salt utilized in the present invention is normally a palladium halide such as $PdCl_2$ which is dissolved in a hydrochloric acid solution. This is then added to a bicarbonate solution containing an inert support and the solution heated to about 95° C. with agitation and held at that temperature until soluble palladium is no longer present, thus assuring no waste of said palladium.

An essential requirement is that sufficient bicarbonate be present to insure that all the palladium is in soluble form prior to heating the mixture. The amount of bicarbonate will be such that the weight ratio of bicarbonate to palladium is within the range of about 5:1 to 85:1. As this ratio increases, improved results are obtained.

It has been found possible to use relatively low ratios of bicarbonate to palladium (i. e., about 10:1 to 40:1) and still retain the improvement obtained at the extremely high ratios by replacing part of the bicarbonate with an alkali metal halide, sodium and potassium chloride being preferred. For example, a reduction rate of 2,4-dinitrotoluene to 2,4-diaminotoluene of 450 parts of nitro compound per minute per part of palladium catalyst can be obtained when the bicarbonate to palladium ratio is 82:1 and no alkali metal halide is present. By reducing the bicarbonate to palladium ratio to 11:1 and having present 304 parts sodium chloride per part of palladium, the same hydrogenation rate can be obtained. Without sodium chloride, the hydrogenation rate is considerably less, i. e., about 300 parts of nitro body per minute per part of palladium catalyst. The alkali metal chloride serves the same function as the excess of bicarbonate; i. e., it maintains the palladium in solution until the precipitation of the palladium, probably as $Pd(OH)_2$, on the support is carried out under the controlled condition of heating said solution to about 90° C. The amount of alkali metal halide that can be used is not critical. The more that is used the lower can be the bicarbonate to palladium ratio, providing that this ratio does not drop below about 5:1. About 50 to about 300 parts of alkali metal chloride per part of palladium has been found to be a useful range.

The use of the alkali metal halide has a further operating advantage in that less equipment is used and corrosive acid can be avoided. This is due to the fact that $PdCl_2$, although insoluble in water without acid, can be readily dissolved in salt solution with formation of the chloropalladite ion $PdCl_4^=$. This permits use of a single reaction kettle containing $PdCl_2$ dissolved in the salt solution to which solid bicarbonate is added. In this way an acid solution of palladium is avoided and no bicarbonate solution is required.

The support upon which the $Pd(OH)_2$ is deposited may be added to the system at any time prior to precipitation. A wide variety of supports may be used such as those normally used for conventional hydrogenation reduction catalysts. For example, diatomaceous earth such as kieselguhr, siliceous materials; inorganic salts such as barium sulfate; and, carbonaceous materials such as charcoal, activated carbon and the like, may be used.

In order that the palladium hydroxide deposited on the support be used as a hydrogenation catalyst, it must first be reduced to metallic palladium. This is preferably done just before use in the hydrogenation system with hydrogen as the reducing agent. Alternate methods can be used, however, as well as alternate reducing agents. For example, after the precipitation of palladium hydroxide on the support is completed, aqueous formaldehyde can be added to the hot mixture with subsequent reduction of palladium hydroxide to palladium metal. Other reducing agents such as glucose, hydrazine, alcohol, glycerine, and the like are also useful. Preferably, however, the catalyst paste of $Pd(OH)_2$ on the support is stored until used and then reduced with hydrogen directly in the apparatus in which the nitro compounds are to be reduced to amines.

The palladium catalyst prepared by the process of this invention may also be activated. It is known that small amounts of certain metals increase the activity of hydrogenation. Such activators may be oxides, hydroxides, carbonates, etc. of magnesium, iron, aluminum, cobalt, nickel, chromium, tungsten, etc. These activators may be incorporated during the preparation of the catalyst; preferably, they are added as metal salts prior to precipitation of the palladium hydroxide. In a preferred process, powdered palladium chloride is added to a sodium chloride solution at room temperature and the mixture stirred until the palladium chloride is completely dissolved; i. e., completely converted to the chloropalladite. A water soluble, activator metal salt ($FeCl_3 \cdot 6H_2O$ for example) is then added, followed by the addition of the support. Bicarbonate is then added, sufficient bicarbonate being chosen so that the desired excess will be obtained; i. e., the weight ratio of bicarbonate to palladium should preferably be between about 10:1 and 40:1 and the mixture then heated to about 90°–95° C. until soluble palladium is no longer present. After cooling, the catalyst is filtered off and upon reduction to catalyst metal yields a hydrogenation catalyst much superior to those prepared by conventional techniques.

The process of this invention is applicable to palladium and activated palladium hydrogenation catalysts which are useful for the reduction of a wide variety of organic nitro compounds. In particular, the process is useful for preparing hydrogenation catalysts for the reduction of aromatic nitro compounds to amines; e. g. nitrobenzene to aniline, the nitrotoluenes to the corresponding amino toluenes, the isomeric nitronaphthalenes to aminonaphthalenes. etc. Hydrogenation catalysts for reduction of heterocyclic and aliphatic nitro compounds can also be prepared by this process; e. g. for reduction of 2-nitrofurane to 2-aminofurane, and 2-nitropropane to 2-aminopropane.

The following examples are illustrative of this novel method of preparing hydrogenation catalysts:

EXAMPLE 1

A slurry of 162 parts of an activated carbon of ultimate particle size of about 45 microns and a surface area of about 1000 square meters per gram in 1450 parts of water is prepared and 200 parts of water distilled out. This process effects removal of occluded gas from the pores of the carbon. A solution of 6 parts of sodium bicarbonate in 100 parts of water is then added over a 5-minute period and the mixture cooled to room temperature. While still at room temperature, a solution composed of 2.85 parts of $PdCl_2$, 1.3 parts of HCl and 85 parts of water is added over 30 minutes. (The weight ratio of sodium bicarbonate to palladium is 3.5:1.0.) The mixture is then heated to 95° C. with agitation and held until a filtered test portion shows no soluble palladium. When this point is reached, the temperature is maintained at 95° C. while a solution of 7 parts of a 37% by weight solution of aqueous formaldehyde in 15 parts of water is added over a 5-minute period. The mixture is agitated further for 30 minutes at 95° C. and then cooled to 40° C. when it is filtered and washed with 500 parts of water. This procedure results in 427 parts of a wet catalyst cake which contains 0.04 parts of palladium metal per part of wet cake.

This catalyst is ready for use and is employed in conventional procedures for reducing nitro compounds to amines. A general hydrogenation procedure as applied to the reduction of 2,4-dinitrotoluene follows:

A steel or nickel-clad pressure reactor, which is jacketed for heating or cooling with water, and which is equipped with baffles and an efficient agitator that rotates at 800–900 R. P. M., is used for the hydrogen reduction. The reactor is charged to about 20–25% of its capacity with 800 parts of a 62–63% by weight solution of 2,4-diaminotoluene (i. e., the "heel" from a previous charge) at 75–85° C. and 0.05–0.10 part of catalyst. The autoclave is then pressured with hydrogen to 105 p. s. i. g. and the agitator is started. The temperature of the stirred mixture is adjusted to 80±2° C. Molten 2,4-dinitrotoluene is then fed in under pressure in portions of approximately 52.8 parts each, to the agitation mass.

As the dinitrotoluene is reduced, a drop in pressure is observed due to consumption of the hydrogen. This pressure drop is also accompanied by a rise in temperature. The temperature is controlled between 90 and 110° C. during the reaction by circulation of 78–80° C. water through the jacket.

After each portion of dinitrotoluene is reduced, the system is repressured with hydrogen to 105 p. s. i. g. prior to adding another portion of dinitrotoluene. Each portion of the nitro body is practically all hydrogenated before adding the next portion. Alternately, if more convenient, hydrogen can be supplied continuously to the reaction mass at constant pressure 100 p. s. i. g. as rapidly as it is consumed by the reaction.

The time required to reduce each portion of the nitro body can be observed and recorded on a pressure recorder. The rate of reduction at 100 p. s. i. g. (average) (i. e., parts of nitro body reduced/minute/part of catalytic metal) can be calculated by dividing the weight of nitro compound reduced by the product of the time required for its hydrogenation multiplied by the weight of catalyst metal used.

When the reactor is filled to 75–80% of its total volume, the feeding of the nitro body and hydrogen is stopped. If the feed of the nitro body is free of catalyst poisons, and pure hydrogen is used, the catalyst will still be active, and it can be used to reduce more compound. However, exposure of the catalyst to the atmosphere in the presence of the diamine has a detrimental effect on the catalytic activity. To re-use or recycle catalyst, it is convenient to allow the reduction mass to stand at 75–80° C. without agitation in the reactor and let the bulk of the catalyst settle out. 2,4-diaminotoluene solution (60–62% purity) is then decanted overhead from the settled catalyst. Sufficient liquid, containing about 75–80% of total quantity catalyst, is left in the reactor to provide a "heel" for resuming the reduction operation as described above. Prior to feeding more dinitro body, 0.01 to 0.02 part of new catalytic metal is added to the settled slurry to compensate for catalyst withdrawn in the decanted liquors.

The decanted liquor is filtered from suspended catalyst and water distilled from the resulting 60% solution of the 2,4-diaminotoluene product. The product is finally isolated by distillation under diminished pressure. In this manner, about 1200 parts of 2,4-dinitrotoluene are reduced with 25 parts of catalyst prepared above, which represents 0.1 part of catalyst metal to yield about 725 parts of 2,4-diaminotoluene. The rate of hydrogenation with this catalyst is 75 parts of dinitrotoluene per minute per part of catalyst metal.

When the above procedure is carried out with conventional catalysts such as those described by Benner et al., U. S. 2,619,503, the reduction rate is about 30 parts of dinitrotoluene per part of catalyst metal.

EXAMPLE 2

A slurry of 81 parts of activated carbon of about 45 microns and a surface area of about 1000 square meters/gram in 1450 parts of water is prepared and 200 parts of water distilled out. This process effects removal of occluded gas from the pores of the carbon. A solution of 40 parts of sodium bicarbonate in 300 parts of water is then added over a 5-minute period and the mixture cooled to room temperature. While still at room temperature, a solution composed of 1.4 parts of $PdCl_2$, 0.6 part of HCl and 140 parts of water is added over 30 minutes. (The weight ratio of sodium bicarbonate to palladium is 48:1.) The mixture is then heated to 95° C. for a 15–20 minute period at which time soluble palladium will no longer be present and a solution of 10 parts of 37% formaldehyde in 25 parts of water added. Heating is continued for 30 minutes, the mixture then cooled to 40° C. and filtered. In this way 188 parts of a wet cake of catalyst is obtained in which 22 parts of wet cake contains 0.1 part of palladium metal.

When this catalyst is used to reduce 2,4-dinitrotoluene as described in Example 1, a reduction rate of 140 parts of the nitro compound per minute per part of catalyst is obtained.

Instead of reducing the palladium ion with formaldehyde, this step can be omitted and reduction with hydrogen carried out on the precipitated paste. Essentially the same results are obtained when using hydrogen reduction.

Another alternate procedure involves separate preparation of the palladium solution in bicarbonate and subsequent addition of this to a slurry of carbon. Catalyst prepared in this manner gives results essentially the same as stated above.

EXAMPLE 3

A slurry of 28 parts of an acetylene black is suspended in 500 parts of water. A solution of 20 parts of sodium bicarbonate in 200 parts of water is added and a solution of 0.467 part of palladium chloride in 20 parts of 0.55% HCl and 30 parts of water is added dropwise at room temperature over a 30-minute period. (Weight ratio of NaHCO$_3$ to Pd=71:1.)

The mixture is heated to 95° C., agitated and held at this temperature for 30 minutes. Then, 10 parts of 18.5% HCHO solution is added dropwise in 5 minutes while stirring vigorously and holding the temperature at 95° C. for 30 minutes. After cooling to 40° C., the catalyst paste is filtered and washed on the filter with 100 parts of water. The wet paste, consisting of 160 parts contains 0.28 part of catalytic palladium (a loading of Pd on carbon of 1.0%) and can be used directly, without drying, as catalyst for the hydrogenation of nitro compounds. When so used as described in Example 1, a reduction rate of 210 parts of dinitrotoluene per minute per part of palladium is obtained.

When the same catalyst is prepared under comparable conditions except that the palladium chloride solution is added to the suspension of bicarbonate and carbon support at 95° C. instead of room temperature the rate of hydrogenation obtained is significantly less than 200 parts of dinitrotoluene per minute per part of palladium.

EXAMPLE 4

Activated catalysts are prepared in the manner described in Example 3, by incorporating ferric chloride with the palladium chloride solution before adding it to the suspension of bicarbonate and support at room temperature. Table I indicates the conditions and results obtained:

Table I

Catalyst support: Acetylene Black
Loading: 1% Pd, 1% Fe$^{+3}$
Catalyst concentration during reduction: 0.05 to 0.07 part Pd/1000 parts of reduction mass

| Wt. Ratio, NaHCO$_3$/Pd | Reduction Rate, Parts Dinitrotoluene/min./part Pd |
|---|---|
| 18 | 300 |
| 71 | 450 |

Potassium bicarbonate can be used instead of sodium bicarbonate and the same results obtained as with Pd.

The catalysts prepared by the addition of small amounts of hydroxide of platinum, nickel, cobalt, chromium, and magnesium according to the general technique described above gave the expected improvement in rate of hydrogen reduction of 2,4-dinitrotoluene to 2,4-diaminotoluene.

EXAMPLE 5

As already indicated the amount of bicarbonate used can be considerably reduced by replacing a part of it with an alkali metal halide. The following tables will illustrate this effect:

Table II

EFFECT OF ALKALI METAL CHLORIDES IN COMBINATION WITH BICARBONATES

Catalyst: Palladium, activated with Fe$^{+3}$ supported on acetylene black
Preparation: Solution of PdCl$_2$ in HCl and FeCl$_3$ in water added to suspension of support in bicarbonate-salt solution at 25° C. Reduced with hydrogen
Loading: 0.85% Pd, 0.85% Fe$^{+3}$ (on wt. of support)

| Metal Halide (MCl) | Parts/100 parts of solution | | | Wt. Ratio | | Reduction Rate—Parts DNT[1] min./part Pd |
|---|---|---|---|---|---|---|
| | Pd | NaHCO$_3$ | MCl | NaHCO$_3$/Pd | MCl/Pd | |
| None | 0.058 | 4.76 | | 82.0 | | 450 |
| None | 0.076 | 1.35 | | 17.8 | | 300 |
| NaCl | 0.058 | 0.625 | 17.7 | 10.7 | 304 | 450 |
| KCl | 0.058 | 0.625 | 16.7 | 10.7 | 285 | 450 |

[1] DNT=2,4-dinitrotoluene.

EXAMPLE 6

A clean reaction kettle is charged with 240 parts of water, agitation started, and 48 parts of sodium chloride added. When the salt is dissolved, 4.06 parts of palladium chloride and 0.672 part of chloroplatinic acid is added. The mixture is then stirred at 30° C. until complete solution of the noble metals is obtained. At this point, 670 parts of water are added and also 13 parts of ferric chloride hexahydrate, and 53.7 parts of a carbon black having an oil absorption factor of 290 and the mixture is stirred for 15 minutes. To this mixture, 144 parts of sodium bicarbonate are added while using about 48 parts of water to wash any solid material adhering on the sides of the kettle into the reaction mass. The mixture is stirred 30 minutes and heat is then applied, bringing the mixture up to 90° C. in about 1 hour. After 80 to 90 minutes at 90° C. the reaction is considered complete. The reaction mass is then rapidly cooled to 60° C. and filtered. The press cake obtained is washed by displacement with 190 parts of water and sucked fairly dry.

The catalyst paste as prepared in this manner contains a loading on a dry basis of 4.5% palladium, 0.5% platinum, and 5% ferric iron (as hydroxide) and is preferably diluted with highly oleophilic carbon prior to use as a reduction catalyst. Preferably, this catalyst is diluted with 100 parts of an oleophilic carbon having an oil absorption factor of about 290 for each 86 parts of the paste. When used in the reduction of 2,4-dinitrotoluene, in this way, a reduction rate of 700 parts of dinitrotoluene per minute per part of catalyst metal is obtained.

We claim:

1. A method of preparing an improved palladium hydrogenation catalyst which method comprises the preparation, at room temperature, of a solution of palladium chloride in an aqueous alkali metal bicarbonate system, the weight ratio of bicarbonate to palladium being within the range of about 5:1 to 85:1, and heating said solution to 90–95° C., in the presence of an inert support for at least about a 15-minute period.

2. The method of claim 1 in which the palladium hydrogenation catalyst is activated.

3. The method of claim 1 in which the palladium hydrogenation catalyst is activated with an iron compound.

4. A method of preparing an improved palladium hydrogenation catalyst which method comprises the preparation, at room temperature, of a solution of palladium chloride in an aqueous alkali metal bicarbonate-alkali metal halide system, the weight ratio of bicarbonate to palladium being within the range of about 5:1 to 85:1, and heating said solution to 90–95° C., in the presence of an inert support for at least about a 15-minute period.

5. The method of claim 4 in which the palladium hydrogenation catalyst is activated.

6. The method of claim 4 in which the palladium hydrogenation catalyst is activated with an iron compound.

7. A method for preparing an improved palladium hydrogenation catalyst which method comprises the preparation, at room temperature, of a solution of palladium chloride in an aqueous alkali metal bicarbonate system, the weight ratio of bicarbonate to palladium being within the range of 5:1 to 85:1 and heating said solution to 90–95° C., in the presence of an inert support, until soluble palladium is no longer present.

8. The method of claim 7 in which the palladium hydrogenation catalyst is activated.

9. The method of claim 7 in which the palladium hydrogenation catalyst is activated with an iron compound.

10. A method for preparing an improved palladium hydrogenation catalyst which method comprises the preparation, at room temperature, of a solution of palladium chloride in an aqueous alkali metal bicarbonate alkali metal halide system, the weight ratio of bicarbonate to palladium being within the range of about 5:1 to 85:1, and heating said solution to 90–95° C., in the presence of an inert support, until soluble palladium is no longer present.

11. The method of claim 7 in which the palladium hydrogenation catalyst is activated with platinum.

12. The method of claim 7 in which the palladium hydrogenation catalyst is activated with platinum and iron.

13. The method of claim 10 in which the palladium hydrogenation catalyst is activated.

14. The method of claim 10 in which the palladium hydrogenation catalyst is activated with an iron compound.

References Cited in the file of this patent

UNITED STATES PATENTS

| | | |
|---|---|---|
| 1,222,660 | Paal | Apr. 17, 1917 |
| 2,030,283 | De Rewal | Feb. 11, 1936 |
| 2,407,066 | Dunlop | Sept. 3, 1946 |
| 2,467,283 | Warner | Apr. 12, 1949 |
| 2,485,945 | Walker | Oct. 25, 1949 |
| 2,553,415 | Kearby et al. | May 15, 1951 |
| 2,651,598 | Ciapetta | Sept. 28, 1953 |
| 2,681,938 | Lindlar | June 22, 1954 |